US 6,678,892 B1

(12) United States Patent
Lavelle et al.

(10) Patent No.: US 6,678,892 B1
(45) Date of Patent: Jan. 13, 2004

(54) MULTIMEDIA ENTERTAINMENT UNIT FOR USE IN A VEHICLE

(75) Inventors: Patrick M. Lavelle, Sayville, NY (US); Thomas C. Malone, Miller Place, NY (US); George C. Schedevy, Aquebogue, NY (US); James R. Tranchina, Dix Hills, NY (US)

(73) Assignee: Audivox Corporation, Hauppauge, NY (US)

( * ) Notice: Subject to any disclaimer, the term of this patent is extended or adjusted under 35 U.S.C. 154(b) by 416 days.

(21) Appl. No.: 09/698,916

(22) Filed: Oct. 27, 2000

(51) Int. Cl.[7] .................................................. H04N 7/18
(52) U.S. Cl. ........................................ 725/75; 348/837
(58) Field of Search ............................ 455/66, 95, 129, 455/569, 90, 550, 575; 381/14, 74; 345/204; 340/825.24, 825.69, 901, 905; 725/75, 76, 77; 348/552

(56) References Cited

U.S. PATENT DOCUMENTS

| | | | | |
|---|---|---|---|---|
| 5,555,466 A | * | 9/1996 | Scribner et al. ............... 725/75 |
| 5,771,441 A | * | 6/1998 | Altstatt ......................... 455/66 |
| 6,058,288 A | * | 5/2000 | Reed et al. .................... 455/6.3 |
| 6,243,645 B1 | * | 6/2001 | Moteki et al. ................ 701/211 |
| 6,266,815 B1 | * | 7/2001 | Shen et al. ..................... 725/76 |
| 6,300,880 B1 | * | 10/2001 | Sitnik ...................... 340/825.25 |
| 6,317,039 B1 | * | 11/2001 | Thomason ................... 340/505 |

* cited by examiner

Primary Examiner—Victor R. Kostak
(74) Attorney, Agent, or Firm—F. Chau & Associates, LLP (57) ABSTRACT

There is provided an entertainment unit for a vehicle. The unit includes an assembly housing adapted to mount against an interior surface of the vehicle. A bus is adapted to couple at least one of video and audio signals from each of a plurality of input devices. At least one display device, houseable in the assembly and operatively coupled to the bus, is adapted to reproduce the video signals. At least one wireless transmitter operatively coupled to the bus, is adapted to wirelessly and simultaneously transmit a plurality of audio programs to a plurality of wireless headphone sets. The at least one wireless transmitter includes at least one multiplexor adapted to select a specific input device whose audio output is to be wirelessly transmitted to a given one of the plurality of wireless headphone sets.

26 Claims, 4 Drawing Sheets

MULTIMEDIA ENTERTAINMENT UNIT FOR USE IN A VEHICLE

TECHNICAL FIELD

The present invention relates generally to vehicles and, in particular, to a multimedia entertainment unit for use in a vehicle.

BACKGROUND DESCRIPTION

As cars have been continuously updated to include new and useful features for the enjoyment and/or utility of a driver and his or her passengers, devices generally found in the home have made their way into cars as optional features. Such features include the television, the video cassette player (VCP), the compact disk (CD) player, and the digital video disk (DVD) player. These features undoubtably provide enjoyment and/or utility to the driver and/or passengers of a vehicle. For example, children may become occupied by, for example, watching a movie and, thus, may leave the driver better able to concentrate on operating the vehicle. Moreover, passengers in a vehicle undertaking a long journey may better pass the time by viewing a movie. However, it has generally been the case that only one particular type of media can be played at a given time in a given vehicle. For example, only one movie may be played at a given time in a given vehicle, and such playback is to the exclusion of any other media sources such as, e.g., the radio. This is true for a variety of reasons. One such reason is that the movie playing device (e.g., VCP and DVD player) is typically coupled to the existing speaker system of the vehicle, thus allowing only one media source to be played back through the speakers at any given time. Another such reason is that it is difficult for a person to follow the play back of a particular audio media source when another audio media source is simultaneously being played back.

Thus, if the occupants of the vehicle have differing tastes with respect to, for example, movies and/or music, then not all of the passengers will be satisfied by what is audibly and/or visibly reproduced at any given time. Accordingly, there is a need for a multimedia entertainment unit for a vehicle which allows for a plurality of passengers to each watch and/or listen to a different media.

SUMMARY OF THE INVENTION

The problems stated above, as well as other related problems of the prior art, are solved by the present invention, a multimedia entertainment unit for a vehicle.

According to a first aspect of the invention, there is provided an entertainment unit for a vehicle. The unit includes an assembly housing adapted to mount against an interior surface (preferably the roof) of the vehicle. A bus is adapted to couple at least one of video and audio signals from each of a plurality of input devices. At least one display device, houseable in the assembly and operatively coupled to the bus, is adapted to reproduce the video signals. At least one wireless transmitter operatively coupled to the bus, is adapted to wirelessly and simultaneously transmit a plurality of audio programs to a plurality of wireless headphone sets.

According to a second aspect of the invention, the wireless signals are at least one of radio frequency and infrared signals.

According to a third aspect of the invention, the plurality of input devices include at least one of a television tuner, a video cassette player (VCP), a compact disk (CD) player, a digital video disk (DVD) player, an AM/FM radio, and a video game player.

According to a fourth aspect of the invention, the plurality of input devices include an external audio/video signal processor adapted to input at least one of the audio signals and the video signals from an external source.

According to a fifth aspect of the invention, the external source is a portable media device.

According to a sixth aspect of the invention, the unit further includes signal processing facilities adapted to perform at least one of signal processing and signal conversion, with respect to at least one of the audio signals and the video signals.

According to a seventh aspect of the invention, the signal processing facilities are adapted to perform at least one of digital signal processing, encoding, decoding, encrypting, decrypting, compressing, decompressing, analog-to-digital conversion (ADC), digital-to-analog conversion (DAC), and error correction.

According to an eighth aspect of the invention, the at least one display device is mounted in the entertainment unit in one of a non-fixed configuration and a fixed configuration.

According to a ninth aspect of the invention, the at least one display device employs one of a liquid crystal display (LCD), light emitting diodes (LEDs), and a gas plasma.

According to a tenth aspect of the invention, the liquid crystal display is based upon one of active matrix technology and passive matrix technology.

According to an eleventh aspect of the invention, the at least one display device employs touch screen technology.

According to a twelfth aspect of the invention, the at least one display device includes one of picture-in-picture and split screen capability.

According to a thirteenth aspect of the invention, the at least one wireless transmitter includes at least one multiplexor adapted to select a specific input device whose audio output is to be wirelessly transmitted to a given one of the plurality of wireless headphone sets.

According to a fourteenth aspect of the invention, the at least one wireless transmitter is adapted to wirelessly transmit the plurality of audio programs to each of the plurality of wireless headphone sets as a left audio channel and a right audio channel.

According to a fifteenth aspect of the invention, the left audio channel and the right audio channel correspond to different frequencies.

According to a sixteenth aspect of the invention, the at least one wireless transmitter is adapted to wirelessly transmit the plurality of audio programs to each of the plurality of wireless headphone sets as a left audio channel and a right audio channel, each of the channels having a different frequency for each of the plurality of wireless headphone sets.

According to a seventeenth aspect of the invention, the bus comprises a video bus and an audio bus.

According to an eighteenth aspect of the invention, the video bus is coupled to the display device and the audio bus is coupled to the at least one wireless transmitter.

According to a nineteenth aspect of the invention, the at least one wireless transmitter includes an optical transmitting device and at least some of said plurality of wireless headphone sets include a photosensitive device.

According to a twentieth aspect of the invention, the at least one wireless transmitter and at least some of the plurality of wireless headphone sets include an antenna.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

To facilitate a clear understanding of the present invention, a brief description of the invention will now be given, followed by a more detailed description with respect to FIGS. 1–3. As noted above, the invention is directed to a multimedia entertainment unit for a vehicle. The entertainment unit is mounted within the interior of the vehicle, such as, for example, on the vehicle floor or on a wall of the vehicle. However, it is preferable that the entertainment unit is mounted overhead to the ceiling of the vehicle.

The invention allows a plurality of passengers in the vehicle to each watch and/or listen to a different media. The capability of allowing the plurality of passengers to watch, for example, different movies at the same time is achieved through the use of two or more display devices and/or one or more display devices having picture-in-picture capability or split screen capability. The capability of allowing the plurality of passengers to hear, for example, the different movies or a movie and a compact disk soundtrack at the same time, is achieved through the use of a wireless transmitter and wireless headphones. As is known to one of ordinary skill in the related art, the wireless headphones will include a wireless receiver for receiving the wireless signals transmitted by the wireless transmitter.

The wireless signals can be any type of wireless signal including, but not limited to, radio frequency and infrared signals. It is to be noted that the current transmission capability (bandwidth) of infrared signals is approximately 1.5 to 2.0 Mbits/sec, with a maximum projected bandwidth of 16 Mbits/sec.

Figure 1A:
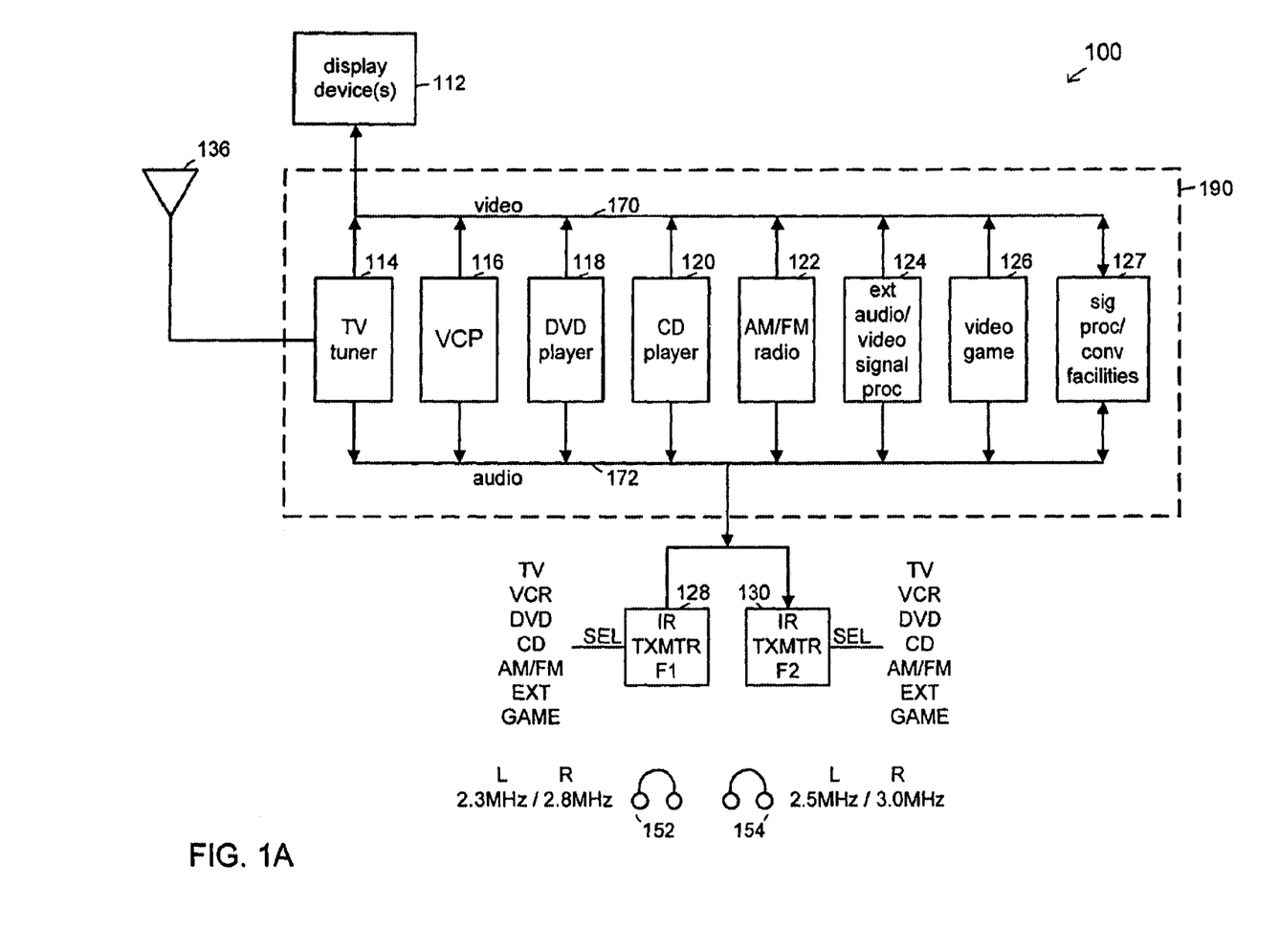
FIG. 1A is a block diagram illustrating the elements of an entertainment unit 100 according to an illustrative embodiment of the invention.

FIG. 1A is a block diagram illustrating the elements of an entertainment unit 100 according to an illustrative embodiment of the invention. The entertainment unit 100 is ultimately installed in a vehicle. The entertainment unit 100 includes at least one or any combination of a display device (hereinafter "display device") 112, a TV tuner 114, a video cassette player (VCP) 116, a digital video disk (DVD) player 118, a compact disk (CD) player 120, an amplitude modulation/frequency modulation (AM/FM) radio 122, an external audio/video signal processor 124, a video game player 126, facilities for performing signal processing and/or signal conversion 127 (hereinafter "signal processing/conversion facilities"), a first wireless transmitter 128, and a second wireless transmitter 130.

The TV tuner 114, the VCP 116, the DVD player 118, the CD player 120, the AM/FM radio 122, the video game player 126, and the external audio/video signal processor 124 (in particular, any external device coupled to external audio/video signal processor 124) may also be collectively referred to herein as input devices 190. It is to be appreciated that the devices described above with respect to the input devices 190 are merely illustrative and, thus, other devices may also be employed in accordance with the invention, while maintaining the spirit and scope thereof.

The first wireless transmitter 128 and the second wireless transmitter 130 each have multiplexing capabilities to enable the selection of a particular device (e.g., one of the input devices 190) whose audio signal is to be wirelessly transmitted. Selection is made through a SELECT (SEL) input. Of course, wireless transmitters without such multiplexing capabilities may also be used; however, in such a case, a separate multiplexor s) would be coupled between such transmitters and the audio outputs of the input devices 190.

The elements of the entertainment unit 100 are intended to interact with a first wireless headphone set 152 and a second wireless headphone set 154. It is to be appreciated that while the illustrative embodiment of FIG. 1A is shown with two wireless headphone sets (i.e., 152, 154), the invention is not so limited and, thus, any number of wireless headphone sets may be used in conjunction with the invention. For example, one or more headphones may be used (e.g., one wireless headphone set for each passenger).

The first wireless transmitter 128 and the second wireless transmitter 130 transmit wireless signals to the first wireless headphone set 152 and the second wireless headphone set 154, respectively. Of course, other configurations are possible which maintain the spirit and scope of the invention, as readily contemplated by one of ordinary skill in the related art.

The elements of the entertainment unit 100 may be connected by one or more buses. Such bus(es) may be completely or partially contained within the unit 100. In the illustrative embodiment of FIG. 1A, a video bus 170 and an audio bus 172 are used. The video bus 170 couples video signals output from the elements of the entertainment unit 100 to the display device 112. The audio bus 172 couples audio signals output from the elements of the entertainment unit 100 to the wireless transmitters 128 and 130.

An antenna 136 may be located within the entertainment unit 100 or may more likely be located external thereto. For example, antenna 136 may be the original antenna included in the vehicle, which is typically used to receive frequencies associated with AM/FM radio stations and television stations. Such an antenna is typically located in the windshield or protruding from the exterior of the vehicle. Moreover, antenna 136 may be a special purpose antenna, capability of receiving frequencies corresponding to, for example, satellite communications from a satellite or satellite network. The satellite communications may include movies and other media types (e.g., music and so forth). In any event, the antenna 136 is coupled to the entertainment unit 100. In the illustrative embodiment of FIG. 1A, the antenna 136 is simply coupled to the TV tuner 114 and the AM/FM radio 122. If satellite or other communication are desired, the antenna would likely be coupled to the signal processing/conversion facilities 127 which would perform functions such as demodulating, signal discrimination, and signal splitting, prior to providing the appropriate signal(s) (video and/or audio) to the appropriate reproduction device (display device 112 and/or wireless headphone sets 152, 154).

The external audio/video signal processor 124 is employed to receive signals from an external device (i.e., one not included in the entertainment unit 100) so as to couple the external device to the entertainment unit 100 for reproduction of the signals output therefrom. Such external devices include handheld video games, handheld TV's, portable DVD players, portable CD players, and so forth.

It is to be appreciated that in other embodiments of the invention, the external audio/video signal processor 124 may be included as part of the signal processing/conversion facilities 127, the latter being described in further detail hereinbelow.

It to be understood that some of the elements shown in FIG. 1A may be included in the unit entertainment 100, in compartments comprised therein (not shown), or they may be separate from the entertainment unit 100 but nonetheless intended to interact with the entertainment unit 100.

It is to be appreciated that the display device 112 is not limited to any particular kind of display device. Accordingly, display devices may be used which include, but are not limited to, liquid crystal displays (LCDs), light emitting diodes (LEDs), and gas plasma. It is to further appreciated that any variations of the aforementioned types of displays may be used. For example, with respect to liquid crystal displays, active matrix (e.g., thin film transistor) technology or passive matrix (e.g., dual scan) technology may be employed. The display device 112 may also employ touch screen, technology, so that users can interact with the console by either touching the screen or placing a specified device (e.g., electrostatic pen) near the screen. In a preferred embodiment of the invention, a liquid crystal display is employed which uses active matrix technology.

In the case of more than one display device, two or more different input devices 190 (e.g., the DVD player 118 and the TV tuner 114) may be input to the display devices. In such a case, additional multiplexors (not shown) may be employed to determine which display device is to reproduce a particular video signal from a plurality of video signals. Moreover, one or more display devices having picture-in-picture capability or split screen capability may be employed. Given the teachings of the invention provided herein, one of ordinary skill in the related art will contemplate these and various other variations and configurations of the elements of the invention, while maintaining the spirit and the scope thereof.

The input devices 190 may be located within the entertainment unit 100 or some or all of the input devices 190 may be located external to the entertainment unit 100. In any event, the input devices 190 should be coupled to the entertainment unit 100, either directly or through the external audio/video signal processor 124. In particular, video outputs (if any) of the input devices 190 should ultimately be connected to the video bus 170 and audio outputs (if any) of the input devices 190 should ultimately be connected to the audio bus 172 (or corresponding inputs (not shown) of the external audio/video signal processor 124).

The signal processing/conversion facilities 127 may perform such processing/conversion prior to the video signals being provided to the display device 112 and the audio signals being provided to the wireless transmitters 128 and 130. Of course, other arrangements are possible, including having separate signal processing/conversion facilities for the video signals and the audio signals.

The signal processing/conversion facilities 127 may include, but are not limited to, Digital Signal Processors (DSPs), and facilities for performing encoding/decoding, encrypting/decrypting, compressing/decompressing, analog-to-digital conversion (ADC), digital-to-analog conversion (DAC), error correction, and filtering. Such error correction may include, but is not limited to, Cyclic Redundancy Checking (CRC), Error Correction Code or Error Checking and Correcting (ECC), checksum, and so forth. With respect to, for example, encoding/decoding, encrypting/decrypting, and compressing/decompressing, the former of each pair may be performed by any of the input devices (or a device coupled to the external audio/video signal processor) and the latter is performed by the signal processing/conversion facilities 127.

It is to be noted that the wireless signals may be encoded to prevent interference between the two wireless headphone sets 152, 154. Such encoding may be based on technologies such as, for example, spread spectrum technology.

In many cases, the facilities described above may be implemented by one or more codecs. In other cases, additional and/or other circuitry may be required. It is to be appreciated that one of ordinary skill in the related art will contemplate these and various other facilities for performing signal processing and/or signal conversion, while maintaining the spirit and scope of the invention.

Figure 1B:
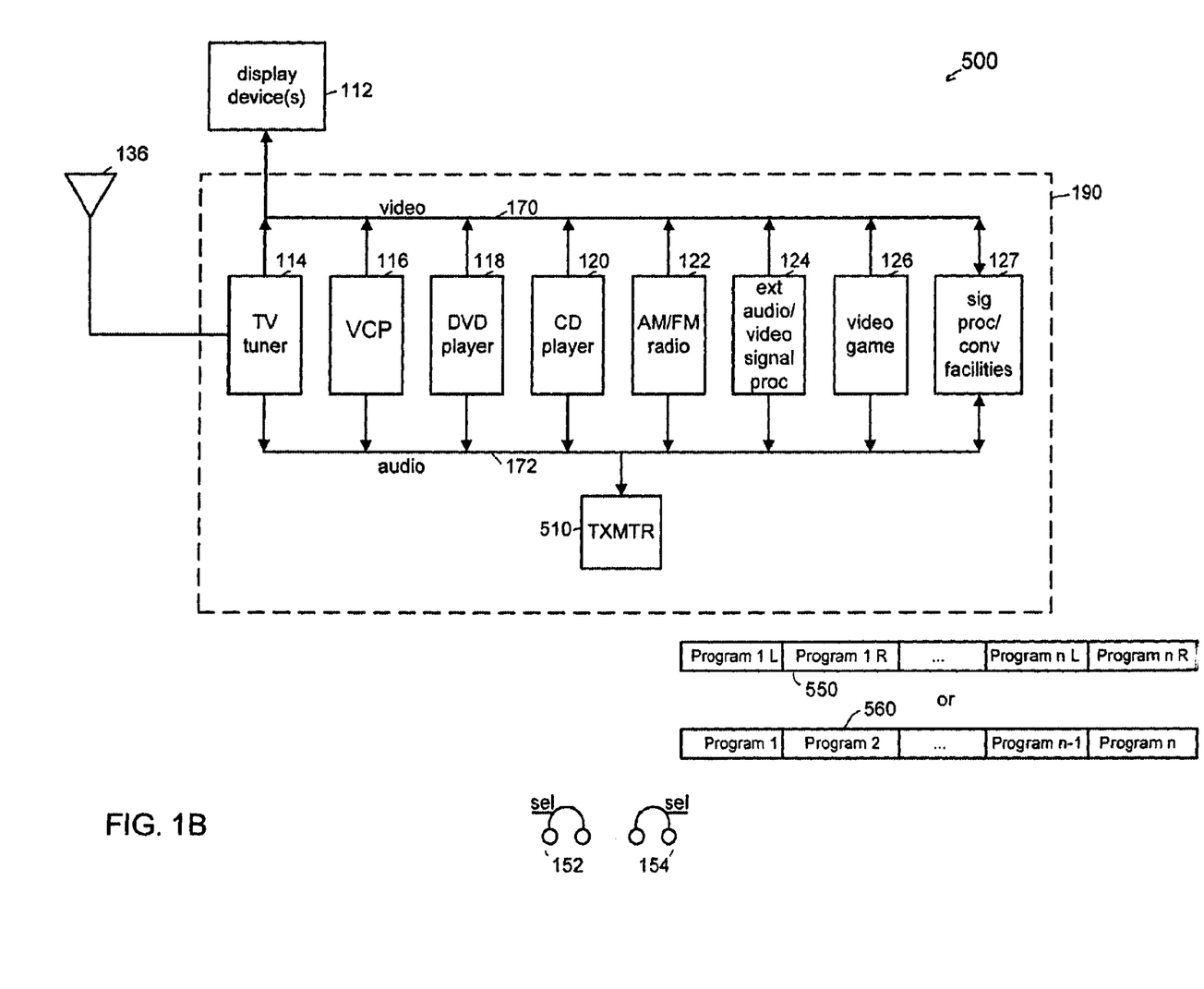
FIG. 1B is a block diagram illustrating the elements of an entertainment unit 500 according to another illustrative embodiment of the invention.

FIG. 1B is a block diagram illustrating the elements of an entertainment unit 500 according to another illustrative embodiment of the invention. Similar to the entertainment unit 100 of FIG. 1A, the entertainment unit 500 of FIG. 1B is ultimately installed in a vehicle.

The entertainment unit 500 includes at least one or any combination of a display device (hereinafter "display device") 112, a TV tuner 114, a VCP 116, a DVD player 118, a CD player 120, an AM/FM radio 122, an external audio/video signal processor 124, a video game player 126, signal processing/conversion facilities 127, and a wireless transmitter 510.

Similar to the entertainment unit 100 of FIG. 1A, the entertainment unit 500 of FIG. 1B is intended to interact with a plurality of wireless headphone sets. For illustrative purposes, the first wireless headphone set 152 and the second wireless headphone set 154 are shown.

It is to be appreciated that the main difference between the entertainment unit 100 of FIG. 1A and the entertainment unit 500 of FIG. 1B is that the first and the second wireless transmitters 128, 130 have been replaced by the wireless transmitter 510 of FIG. 1B, the latter for wirelessly transmitting signals based upon Code-Division Multiple Access (CDMA) technology. The coding and other related operations may be performed by the wireless transmitter 510 and/or by the signal processing/conversion facilities 127. In any event, the requisite circuitry for implementing CDMA technology would be required both on the transmission end (the entertainment unit) and the receiving end (the wireless headphone sets). Such circuitry may include, for example, convolutional encoders, Walsh code generators and PN (pseudo random number) sequence generators, combiners, modulators, de-modulators, correlators, digital-to-analog converters (DACs), analog-to-digital converters (ADCs), and so forth. Given the teachings of the invention provided herein, one of ordinary skill in the related art will readily contemplate the elements required to implement CDMA in an entertainment system according to the invention, while maintaining the spirit and scope thereof.

It is to be appreciated that the use of CDMA technology enables a single transmitter (i.e., wireless transmitter 510) to transmit all programs simultaneously, with a user being able to select the program he or she intends to hear via a selector located on, for example, his or her wireless headphone set. Moreover, the use of CDMA technology enables all of the available frequency bandwidth to be used, while simultaneously minimizing interference.

According to one illustrative embodiment of the invention, the audio programs may be pre-stored in a memory system such that pre-specified memory locations are used to store specific audio programs (i.e., a pre-defined mapping). Of course, a dynamic mapping approach may also be employed. In either case, a memory addressing scheme may be used to write the programs into memory and read them therefrom. A processor and governing program or operating system may be employed to control the memory operations. The processor, governing program or operating system, and memory system may be implemented as part of the signal processing/conversion facilities 127, the wireless transmitter 510, a combination thereof, or separately as independent elements of the entertainment unit 500. Of course, other arrangements are possible and readily contemplated by one of ordinary skill in the art.

It is to be appreciated that the audio programs need not be stored but may be directly processed by, e.g., the signal processing/conversion facilities 127 and/or the wireless transmitter 510 in real-time (or with slight delay) for the purposes of transmitting in CDMA format. Given the teachings of the invention provided herein, one of ordinary skill in the related art will contemplate these and various other arrangements for implementing the invention, while maintaining the spirit and scope thereof.

In the illustrative embodiment of FIG. 1B, the wireless signals (audio programs) are shown transmitted in two distinct ways. In the first approach 550, the left and right audio channels of each of the plurality of audio programs are transmitted as separate streams. In the second approach 560, the left and right audio channels of each of the plurality of audio programs are combined onto a single stream. In the latter case, separation of the channels is performed in the wireless headphone sets. In any event, the plurality of audio programs are then combined, superimposed onto a carrier frequency, and transmitted by the wireless transmitter 510 for receipt by the wireless headphone sets. These and various other ways in which to transmit a plurality of audio programs to a plurality of wireless headphones sets may be readily contemplated and implemented by those of ordinary skill in the art, while maintaining the spirit and scope of the invention.

Figure 2:
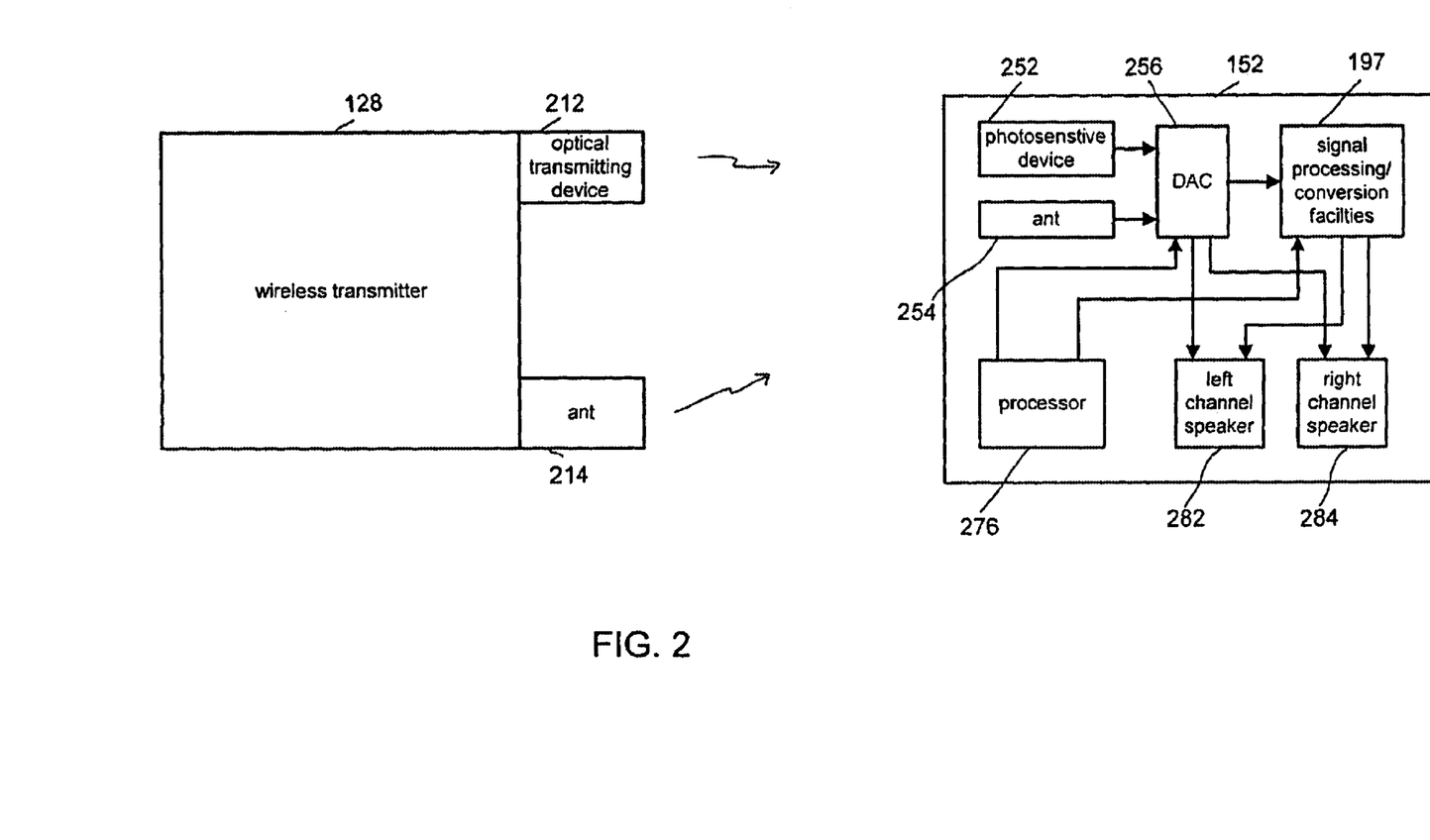
FIG. 2 is a diagram illustrating the wireless transmitter 128 interacting with the wireless headphone set 152 based on optical and/or RF transmission, according to an illustrative embodiment of the invention.

FIG. 2 is a diagram illustrating the wireless transmitter 128 interacting with the wireless headphone set 152 based on optical and/or RF transmission, according to an illustrative embodiment of the invention. It is to be appreciated that the following description is also applicable to the wireless transmitters 130 and/or 510. The wireless transmitter 128 includes an optical transmitting device 212 (e.g., an LED, a laser, and so forth) and an antenna 214. The wireless headphone set 152 includes a photosensitive device 252 (e.g., a phototransistor, a solar cell(s), a SEED (self-optic effect device), and so forth) and an antenna 254. The optical transmitting device 212 and the photosensitive device 252 are used for wireless transmission and reception of optical signals, respectively. The antenna 214 and the antenna 254 are used for wireless transmission and reception of RF signals, respectively.

In the case of wireless optical transmission, the optical transmitting device 212 wirelessly transmits optical (digital) signals to the wireless headphone set 152 by pulsing its light output (e.g., off equals a zero (0) and on equals a one (1)). The photosensitive device 252 in the wireless headphone set 152 detects the optical signals wirelessly transmitted by the optical transmitting device 212.

The wireless headphone set 152 also includes a digital-to-analog converter (DAC) 256 for converting the digital signals into analog signals. The analog signals are then provided to a left channel speaker 282 and a right channel speaker 284 either directly or after processing by another signal processing/conversion facilities 197. For example, in the latter case, the DAC 256 may simply convert the wireless digital signal to a composite analog signal, which is then separated by the other signal processing/conversion facilities 197 into right and left audio channels (when the DAC 256 is separate from the signal processing/conversion facilities 197). Other processing by the signal processing/conversion facilities 197 may include, for example, filtering of the analog signals.

It is to be appreciated that different frequencies may be used for right channels and left channels. For example, as shown in FIG. 1A, the wireless headphone set 152 receives a left channel audio signal corresponding to 2.3 MHz and a right channel audio signal corresponding to 2.8 MHz, while the wireless headphone set 154 receives a left channel audio signal corresponding to 2.5 MHz and a right channel audio signal corresponding to 3.0 MHz. Such an arrangement allows for more than one wireless headphone set to be actively used without frequency interference therebetween. Given the teachings of the invention provided herein, one of ordinary skill in the related art will contemplate these and other approaches for facilitating wireless transmission between the wireless transmitters 128, 130 and the wireless headphone sets 152, 154 while maintaining the spirit and scope of the invention.

It is to be appreciated that a processor 276 may be used to control the functions of the DAC 256 and the signal processing/conversion facilities 197. It is to be further appreciated that the DAC 256 may be separate from (as shown) or part of the signal processing/conversion facilities 197.

The preceding description regarding the functions of the DAC 256 and the signal processing/conversion facilities 197 may also be applied in the case of RF transmission. In such a case, the transmission and reception functions of the optical transmitting device 212 and the photosensitive device 252 are replaced by those of the antennas 214 and 254, respectively. That is, the antenna 214 is used to wirelessly transmit an RF signal which is then received by the antenna 254. A modulator/demodulator may be included or associated with the antennas 214 and 254 to perform such functions as are known to one of ordinary skill in the related art.

Given the teachings of the invention provided herein, one of ordinary skill in the related art will contemplate these and other optical transmitting devices, photosensitive devices, and configurations of the elements of the invention which allow for the transmission and reception of any type of wireless signal (e.g., analog and digital) and appropriate processing/conversion to facilitate reproduction of the content of the wireless signals provided by the wireless transmitters 128, 130.

The preceding description of the entertainment units 100 and 500 have primarily focused on features that may be included in these units to enhance the operation thereof. A description of mounting arrangements for the entertainment units 100 and 500 will now be given.

In a preferred embodiment of the invention, the entertainment unit is mounted overhead to the ceiling of the vehicle. However, it is to appreciated that the invention is not limited to the preceding mounting arrangement and, thus, other mounting arrangements may be employed while maintaining the spirit and scope of the invention. For example, the entertainment unit may be mounted on the vehicle floor, a wall of the vehicle, and so forth.

Moreover, in the preferred embodiment of the present invention, the display device 112 of the entertainment unit is mounted in a flip fashion. That is, the display device 112 is flipped-down when in use, and flipped-up when not in use. Alternatively, the display device 112 may be mounted prominently in the entertainment unit so as to constantly be in the view of the occupants of the vehicle.

Figure 3:
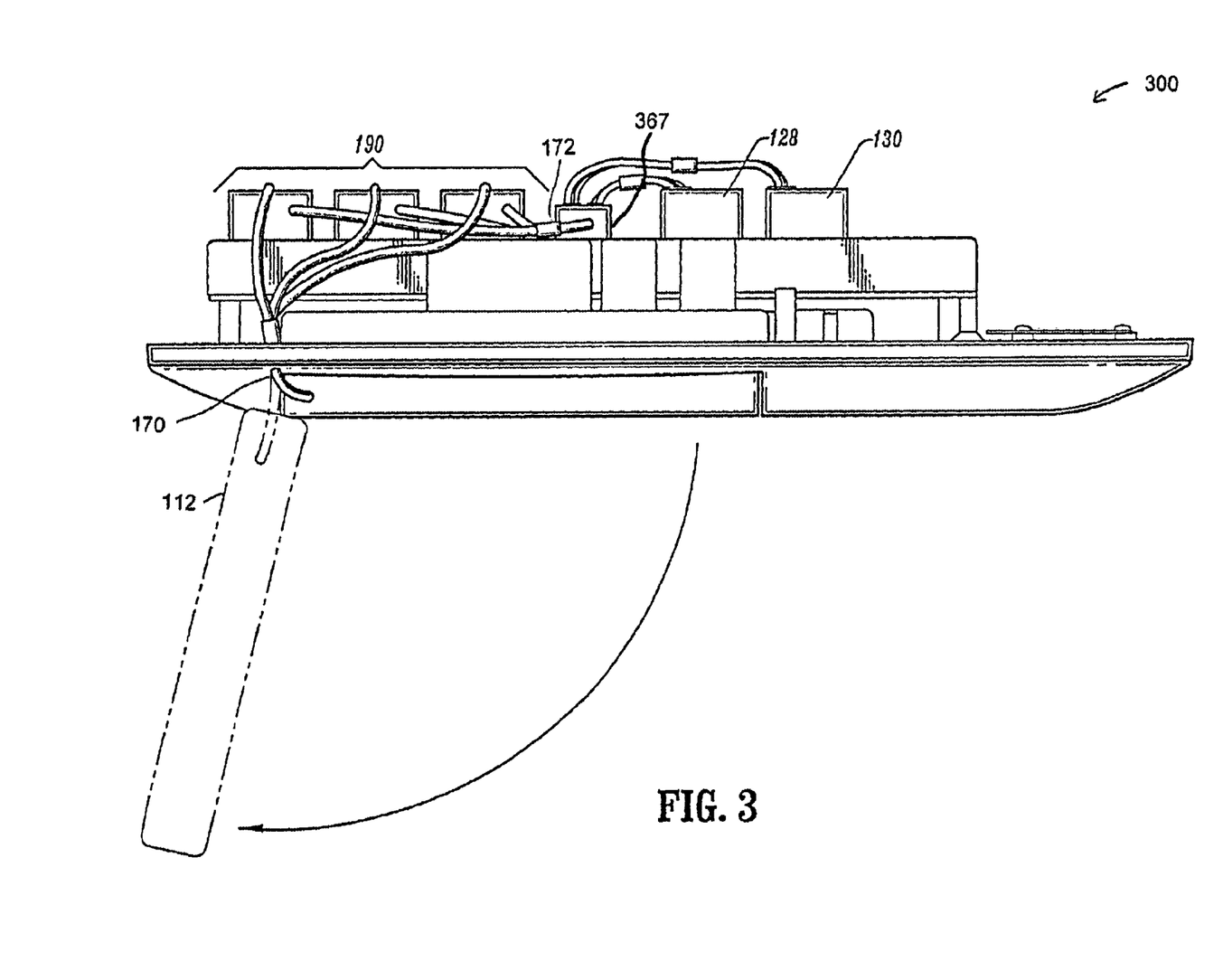
FIG. 3 is a block diagram illustrating an overhead entertainment unit 300 according to a preferred embodiment of the invention.

FIG. 3 is a block diagram illustrating an overhead entertainment unit 300 according to the preferred embodiment of the invention. FIG. 3 is shown with the minimum number of elements, so that the mounting arrangement of the display is emphasized.

In the embodiment of FIG. 3, the entertainment unit 300 is mounted overhead and the display device 112 is mounted in a flip configuration. The entertainment unit 300 includes input devices 190, the display device 112, the first wireless transmitter 128 and the second wireless transmitter 130. The video signals from the input devices 190 are provided to the display device 112 by the video bus 170. The audio signals from the input devices 190 are provided to a splitter 367 by the audio bus 172. The splitter 367 splits the audio signals so that the audio signals may be provided to both the first wireless transmitter 128 and the second wireless transmitter 130.

While the buses (170, 172) shown in FIG. 3 are simply aggregations of wires carrying similar types of signals, other types of buses may be employed. For example, one or more wires or other signal transmission means may be used for each of the audio and the video signals, with the signals being multiplexed with respect to, for example, time, frequency, or codes. Given the teachings of the invention provided herein, one of ordinary skill in the related art will contemplate these and various other implementations of a bus, while maintaining the spirit and scope of the invention.

Associated with the entertainment unit 300 of FIG. 3 is are the first wireless headphone set 152 and the second wireless headphone set 154 (not shown). The display device 112 is mounted so as to flip down (e.g., 90 degrees) along the y-axis. However, it is to be appreciated that while the entertainment unit of FIG. 3 employs a display device with flip up/down capability, the display device may fixed (i.e., of the non-flip type) in other embodiments of the invention.

Although FIG. 3 illustrates the entertainment unit being mounted against the interior roof of the vehicle, the entertainment unit may also be mounted against the front portion of the vehicle or a combination of the roof and the front portion of the vehicle.

In addition to the elements of the entertainment units described above, such units may include controls for other elements/systems of the vehicle such as controls for the air conditioning and heating systems.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An entertainment unit for a vehicle, comprising:
   an assembly housing adapted to mount against an interior surface of the vehicle;
   a bus adapted to couple at least one of video and audio signals from each of a plurality of input devices, wherein said bus comprises a video bus and an audio bus;
   at least one display device, houseable in said assembly and operatively coupled to said bus, adapted to reproduce the video signals; and
   at least one wireless transmitter operatively coupled to said audio bus, adapted to wirelessly and simultaneously transmit a plurality of audio programs from each of the plurality of input devices to a plurality of wireless headphones.

2. The entertainment unit according to claim 1, wherein the wireless signals are at least one of radio frequency and infrared signals.

3. The entertainment unit according to claim 1, wherein the plurality of input devices comprise at least one of a television tuner, a video cassette player (VCP), a compact disk (CD) player, a digital video disk (DVD) player, an AM/FM radio, and a video game player.

4. The entertainment unit according to claim 1, wherein the plurality of input devices comprises an external audio/video signal processor adapted to input at least one of the audio signals and the video signals from an external source.

5. The entertainment unit according to claim 4, wherein the external source is a portable media device.

6. The entertainment unit according to claim 1, further comprising signal processing facilities adapted to perform at least one of signal processing and signal conversion, with respect to at least one of the audio signals and the video signals.

7. The entertainment unit according to claim 6, wherein said signal processing facilities are adapted to perform at least one of digital signal processing, encoding, decoding, encrypting, decrypting, compressing, decompressing, analog-to-digital conversion (ADC), digital-to-analog conversion (DAC), and error correction.

8. The entertainment unit according to claim 1, wherein said at least one display device is mounted in said entertainment unit in one of a non-fixed configuration and a fixed configuration.

9. The entertainment unit according to claim 1, wherein said at least one display device employs one of a liquid crystal display (LCD), light emitting diodes (LEDs), and a gas plasma.

10. The entertainment unit according to claim 9, wherein said liquid crystal display is based upon one of active matrix technology and passive matrix technology.

11. The entertainment unit according to claim 1, wherein said at least one display device employs touch screen technology.

12. The entertainment unit according to claim 1, wherein said at least one display device includes one of picture-in-picture and split screen capability.

13. The entertainment unit according to claim 1, wherein said at least one wireless transmitter comprises at least one multiplexor adapted to select a specific input device whose audio output is to be wirelessly transmitted to a given one of the plurality of wireless headphone sets.

14. The entertainment unit according to claim 1, wherein said at least one wireless transmitter is adapted to wirelessly transmit the plurality of audio programs to each of the plurality of wireless headphone sets as a left audio channel and a right audio channel.

15. The entertainment unit according to claim 14, wherein the left audio channel and the right audio channel correspond to different frequencies.

16. The entertainment unit according to claim 1, wherein said at least one wireless transmitter is adapted to wirelessly transmit the plurality of audio programs to each of the plurality of wireless headphone sets as a left audio channel and a right audio channel, each of the channels having a different frequency for each of the plurality of wireless headphone sets.

17. The entertainment unit according to claim 1, wherein said at least one wireless transmitter comprises an optical transmitting device and at least some of said plurality of wireless headphone sets comprise a photosensitive device.

18. The entertainment unit according to claim 1, wherein said at least one wireless transmitter and at least some of said plurality of wireless headphone sets comprise an antenna.

19. The entertainment unit according to claim 1, wherein at least some of said plurality of wireless headphone sets comprise a digital-to-analog converter.

20. The entertainment unit according to claim 1, wherein said at least one wireless transmitter is adapted to transmit the plurality of audio programs based on Code-Division Multiple Access (CDMA) technology.

21. The entertainment unit according to claim 20, further comprising signal processing facilities, and wherein at least some CDMA operations are performed by said signal processing facilities.

22. The entertainment unit according to claim 20, wherein left audio channels and right audio channels of the plurality of audio programs are coded separately.

23. The entertainment unit according to claim 20, wherein each of the plurality of wireless headphone sets comprises a selector for selecting one of the plurality of audio programs for audio reproduction.

24. The entertainment unit according to claim 20, wherein each of the plurality of wireless headphone sets comprises at least one of a Walsh code generator and pseudo random number (PN) sequence generator for decoding the plurality of audio programs.

25. An entertainment unit for a vehicle, comprising:

an assembly housing adapted to mount against an interior surface of the vehicle;

a video bus adapted to couple video signals from at least some of a plurality of input devices;

an audio bus adapted to couple audio signals from at least some of the plurality of input devices;

at least one display device, houseable in said assembly and operatively coupled to said video bus, adapted to reproduce the video signals; and a wireless transmitter operatively coupled to said audio bus, adapted to wirelessly and simultaneously transmit a plurality of audio programs from at least some of the plurality of input devices to a plurality of wireless headphone sets.

26. An entertainment unit for a vehicle, comprising:

an assembly housing adapted to mount against an interior surface of the vehicle;

an audio bus adapted to couple audio signals from at least two input devices; and a wireless transmitter operatively coupled to said audio bus, adapted to wirelessly and simultaneously transmit the audio signals from the at least two input devices to at least two wireless headphone sets, so that each wireless headphone set receives an audio signal from a different one of the at least two input devices.

* * * * *